UNITED STATES PATENT OFFICE.

CARL SCHMIDT, OF BERLIN, GERMANY, ASSIGNOR TO GUSTAV GILLISCHEWSKI, OF SAME PLACE.

FIREWORKS.

SPECIFICATION forming part of Letters Patent No. 475,897, dated May 31, 1892.

Application filed November 30, 1891. Serial No. 413,579. (No specimens.)

*To all whom it may concern:*

Be it known that I, CARL SCHMIDT, a subject of the Emperor of Germany, and a resident of Berlin, in the Empire of Germany, have invented a new and useful Composition of Matter for Making Star Fireworks, of which the following is a specification.

This invention has for its object the production of a liquid mass which can be put on wooden pins in a similar manner that the mass for Bengal lights is applied, so that matches are obtained by the burning of which so-called "star firework" is produced, which was hitherto made by pulverulent preparations that had to be inclosed in tubular receptacles.

The mass is composed, essentially, as follows: Twelve parts of steel chips are put into a solution of stearine and benzine. After the liquid has been shaken off the dry chips remain covered with a thin layer of stearine, which protects them from rust. Ninety-six parts of nitrate of lead and twelve parts of charcoal are thoroughly mixed in a finely-powdered state with the steel chips treated as described above, and subsequently the whole mixture is brought into a concentrated solution of shellac and spirits. Thereby a liquid is produced, into which wooden pieces placed into a frame in the same manner as in the process for dipping matches are deeply dipped, so that a thick tubular coating adheres. After drying an igniting head as that of ordinary matches is applied to the end of the coated portion of the wooden pieces.

What I claim, and desire to secure by Letters Patent of the United States, is—

The herein-described composition of matter for making star fireworks, consisting of steel chips, charcoal, nitrate of lead, shellac, and spirits, in or about in the proportions specified.

CARL SCHMIDT.

Witnesses:
   W. H. EDWARD,
   W. HAUPT.